United States Patent [19]

Ogata et al.

[11] Patent Number: 4,910,294

[45] Date of Patent: Mar. 20, 1990

[54] TWO-STAGE PROCESS FOR PRODUCTION OF POLYARYLENE SULFIDES WITH LITHIUM COMPOUND

[75] Inventors: Norio Ogata; Hiroyasu Yamato, both of Sodegaura, Japan

[73] Assignee: Idemitsu Petrochemical Company Limited, Tokyo, Japan

[21] Appl. No.: 208,605

[22] Filed: Jun. 20, 1988

[51] Int. Cl.$^4$ ............................................. C08G 75/16
[52] U.S. Cl. .................................................... 528/388
[58] Field of Search ......................................... 528/388

[56] References Cited

FOREIGN PATENT DOCUMENTS

| | | |
|---|---|---|
| 52-12240 | 4/1977 | Japan . |
| 54-8719 | 4/1979 | Japan . |
| 59-22926 | 2/1984 | Japan . |
| 59-197430 | 11/1984 | Japan . |
| 61-7332 | 1/1986 | Japan . |
| 2253622 | 11/1987 | Japan . |

*Primary Examiner*—Harold D. Anderson
*Attorney, Agent, or Firm*—Armstrong, Nikaido, Marmelstein, Kubovcik & Murray

[57] ABSTRACT

Disclosed is a process for producing stably a polyarylene sulfide of high purity and high molecular weight by contacting a dihalogeno aromatic compound with an alkali metal sulfide in a polar solvent which comprises, as a first stage, reacting a dihalogeno aromatic compound with an alkali metal sulfide in a polar solvent in the presence of a lithium compound and in the presence of substantially no water at 200°–270° C. with concentration of remaining alkali metal sulfide being 5.5 g/l-polar solvent or less in terms of sulfur; then adding water in an amount of 1.0–10 mols per 1 mol of said alkali metal sulfide; and, thereafter, as a second stage, carrying out the reaction at 220°–280° C. Preferred dihalogeno aromatic compound is p-dichlorobenzene, preferred alkali metal sulfide is sodium sulfide and/or lithium sulfide and preferred lithium compound is lithium chloride and/or lithium sulfide.

5 Claims, No Drawings

TWO-STAGE PROCESS FOR PRODUCTION OF POLYARYLENE SULFIDES WITH LITHIUM COMPOUND

BACKGROUND OF THE INVENTION

This invention relates to a process for producing a polyarylene sulfide and more particularly it relates to a process for producing stably a polyarylene sulfide of high purity and high molecular weight.

PRIOR ART

Polyarylene sulfides such as polyphenylene sulfide are thermoplastic resins having thermosetting property in a part of molecule and have excellent properties as engineering plastics such as high chemical resistance, good mechanical properties in wide temperature ranges and high thermal resistance and stiffness.

It is known that polyarylene sulfides such as polyphenylene sulfide are usually obtained by polymerization reaction of a dihalogeno aromatic compound and an alkali metal sulfide in a polar solvent. For example, it has been proposed to produce polyphenylene sulfide by polymerization reaction of p-dichlorobenzene with sodium sulfide in a polar solvent (cf. Japanese Patent Examined Publication (Kokoku No. 12240/77).

However, ordinary polyarylene sulfides are small in molecular weight and in order to obtain final products of high molecular weight, the polyarylene sulfides of low molecular weight must be cured by heat treatment and thus the operation is troublesome.

Hitherto, it is known to produce polyphenylene sulfide of high molecular weight by using alkali metal halides such as lithium halide as a catalyst (cf. U.S.Patent No. 4,038,263). However, polyphenylene sulfide having molecular weight high enough to be able to be used for films and fibers has not been obtained by this process.

Moreover, there have been known processes according to which a compound having at least three halogens in a molecule is allowed to be present in the reaction system (cf. Japanese Patent Examined Publication (Kokoku) No. 8719/79 and Japanese Patent Unexamined Publication (Kokai) No. 197430/84). However, the resulting polymers tend to gel and there are problems in production and quality of products.

Furthermore, there is a process according to which water is allowed to be present in the reaction system (cf. Japanese Patent Unexamined Publication (Kokai) Nos. 22926/84 and 7332/86). However, there are such problems as considerable corrosion of the reaction vessel, coloration of resulting polymers and deterioration of quality.

SUMMARY OF THE INVENTION

This invention has been accomplished under the circumstances mentioned above.

That is, the object is to provide a novel process for stable production of a white and highly pure polyarylene sulfide low in melt flow and high in molecular weight, by which the above problems have been solved and there occur no problems such as corrosion of apparatuses such as a reaction vessel.

As a result of the inventors' intensive research, it has been found that above object can be accomplished by a process comprising a reaction in two stages, namely, a first stage reaction effected in the presence of substantially no water and a second stage reaction effected by adding water to the reaction system after completion of the first stage reaction and before the second stage reaction.

The gist of this invention is a process for producing a polyarylene sulfide by contacting a dihalogeno aromatic compound with an alkali metal sulfide in a polar solvent, characterized in that a dihalogeno aromatic compound is reacted with an alkali metal sulfide at 200–270° C. in a polar solvent in the pressence of a lithium compound and in the presence of substantially no water so that the concentration of remaining alkali metal sulfide reaches 5.5 g/1-polar solvent or less in terms of sulfer (the first stage); then water is added thereto in an amount of 0.1–10 mols per 1 mol of said alkali metal sulfide; and thereafter, the reaction is effected at 220–280° C. (the second state).

DESCRIPTION OF THE INVENTION

The polar solvents used in the process of this invention include, for example, amide compounds, lactam compounds, urea compounds and cyclic organophosphorus compounds.

As typical examples of them, mention may be made of N,N-dimethylformamide, N,N-dimethylacetamide, N,N-diethylacetamide, N,N-dipropylacetamide, N,N-dimethylbenzoic acid amide, caprolactam, N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethyl-2-piperidone, N-methyl-2-oxo-hexamethyleneimine, N-ethyl-2-oxo-hexamethyleneimine, hexamethylphosphoric acid triamide, hexaethylphosphoric acid triamide, tetramethylurea, 1,3-dimethylethyleneurea, 1,3-dimethylpropyleneurea, 1-methyl-1-oxosulforan, 1-ethyl-1-oxosulforan, 1-phenyl-1-oxosulforan, 1-methyl-1-oxophosphan, 1-propyl-1-oxophosphan and 1-phenyl-1-oxophosphan. These solvents may be used alone or in combination of two or more.

Among the above polar solvents, N-alkyllactam, N-alkylpyrrolidone and hexaalkylphosphoric acid triamide are suitable and N-methylpyrrolidone is especially suitable.

As the dihalogeno aromatic compounds, mention may be made of, for example, dihalogen substituted benzenes such as o-dichlorobenzene, m-dichlorobenzene, p-dichlorobenzene, o-dibromobenzene, p-dibromobenzene, m-dibromobenzene, p-diiodobenzene, 1-chloro-4-bromobenzene and 1-chloro-4-iodobenzene, dihalogen substituted benzenes such as 2,5-dichlorotoluene, 2,5-dichloro-p-xylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-toluyl-2,5-dichlorobenzene, 1-p-toluyl-2,5-dibromobenzene and 1-hexyl-2,5-dichlorobenzene; dihalogen substituted biphenyls such as 4,4'-dichlorobiphenyl; dihalogenobiphenylalkanes such as 2,2-di(parachlorophenyl) propane; and dihalogen substituted naphthalenes such as 1,4-dichloronaphthalene, 1,6-dichloronaphthalene and 2,6-dichloronaphthalene. Among them, preferred are dihalogen substituted benzenes and especially preferred is p-dichlorobenzene.

The alkali metal sulfides include, for example, lithium sulfide, sodium sulfide, potassium sulfide, rubidium sulfide and cesium sulfide. Preferred are lithium sulfide and sodium sulfide and especially preferred is sodium sulfide. These may be used alone or in combination of two or more.

In the process of this invention, the alkali metal sulfides used can be anhydrides, hydrates or aqueous mixtures. When hydrates or aqueous mixtures are used, it is necessary to carry out dehydration operation before reaction as mentioned hereinafter. Therefore, anhydrides are preferred in that no dehydration operation is required.

As the lithium compounds used in the process of this invention, mention may be made of, for example, mineral acid salts of lithium such as lithium fluoride, lithium chloride, lithium bromide, lithium iodide, lithium carbonate, lithium hydrogencarbonate, lithium sulfate, lithium hydrogensulfate, lithium phosphate, lithium hydrogenphosphate, lithium dihydrogenphosphate, lithium nitrate, lithium nitrite and lithium sulfite; oxyacid salts of lithium such as lithium chlorate, lithium chromate and lithium molybdate; lithium carboxylates such as lithium formate, lithium acetate, lithium oxalate, lithium malonate, lithium propionate, lithium butyrate, lithium isobutyrate, lithium maleate, lithium fumarate, lithium dibutanoate, lithium valerate, lithium hexanoate, lithium octanoate, lithium tartrate, lithium stearate, lithium oleate, lithium benzoate and lithium phthalate; lithium sulfonates such as lithium benzenesulfonate and lithium p-toluenesulfonate; lithium alkoxides such as lithium methoxide, lithium ethoxide, lithium isopropoxide, lithium-n-propoxide, lithium butoxide and lithium phenoxide; lithium acetate such as lithium acetylacetonate or organic lithium compounds, various compounds such as lithium sulfide, lithium oxide and lithium hydroxide. Among them, preferred are lithium halides such as lithium chloride, lithium carboxylates such as lithium acetate and lithium carbonate and epecially preferred is lithium chloride. These lithium compounds may be used alone or in combination of two or more.

The lithium compounds used in the process of this invention can be anhydrides, hydrates or aqueous mixtures. When they are used in the form of hydrate or aqueous mixture, in some cases, dehydration operation must be carried out as mentioned hereinafter.

The reaction of the first stage and/or that of the second stage can be carried out in the presence of branching agents or molecular weight adjusting agents such as active hydrogen-containing halogeno aromatic compounds, polyhalogeno aromatic compounds and polyhalogeno aromatic nitro compounds and/or liquid property adjusting agents such as alkali hydroxides and/or polymerization additives such as metal salts and/or reducing agents and/or inert organic solvents. These can be used in the anhydrous state or a hydrous state such as hydrates, water-containing substances or aqueous mixtures, but when they are used in a hydrous state in the reaction of the first stage, they must be fed in a substantially anhydrous state by subjecting them to sufficient dehydration treatment before reaction.

As the active hydrogen-containing halogeno aromatic compounds, there may be used aromatic compounds which have at least one aromatic ring in which a group having active hydrogen attaches to at least one carbon atom of those forming the aromatic ring and halogen atoms attach to at least two carbon atoms of those forming the aromatic ring.

As the active hydrogen-containing halogeno aromatic compounds, mention may be made of, for example, active hydrogen-containing dihalogenobenzene compounds such as dihalogenoanilines, dihalogenothiophenols, dihalogenophenols and dihalogeno(phenyl) aminobenzenes; and active hydrogen-containing polyhalogenobenzene compounds such as trihalogenoanilines, 2,4,5-trihalogenothiophenols, trihalogenophenols and trihalogeno(phenylamino benzenes. Besides, diamino-dihalogenodiphenyl ethers may also be used.

In this invention, there may be also used those active hydrogen-containing halogeno aromatic compounds wherein a hydrogen atom attaching to a carbon atom which forms an aromatic ring is substituted with other inactive group, for example, a hydrocarbon group such as an alkyl group.

Among these active hydrogen-containing halogeno aromatic compounds, preferred are active hydrogen-containing dihalogenobenzene compounds, more preferred are dihalogenoanilines and especially preferred is dichloroaniline.

The polyhalogeno aromatic compounds are aromatic compounds substituted with at least three halogen atoms. Examples thereof are 1,2,4-trichlorobenzene, 1,3,5-trichlorobenzene and 1,4,6-trichloronaphthalene.

The polyhalogeno aromatic nitro compounds include, for example, dihalogenonitrobenzenes and dihalogenonitronaphthalenes.

By using these active hydrogen-containing aromatic compounds and/or the polyhalogeno aromatic compounds and/or the polyhalogeno aromatic nitro compounds, properties of the resulting polymers can be improved, for example, the branching degree of the resulting polyarylene sulfide can be enhanced, molecular weight can be further increased, melt flow can be decreased and amount of remaining salt can be reduced.

In addition to the above exemplified various compounds, organic compounds having 3 or more reactive halogen atoms such as cyanuric chloride can be used as the branching agent or molecular weight adjusting agent.

These compounds as branching agents or molecular weight adjusting agents may be used alone or in a combination of 2 or more.

As the metal salts used as polymerization additives, mention may be made, for example, carboxylic acid salts of metals belonging to Groups I–IV of the periodic table such as potassium acetate, zinc acetate and sodium acetate; mineral acid salts of alkali metals or alkaline earth metals such as sodium phosphate; and sulfonic acid salts of alkali metals such as sodium benzenesulfonate.

These metal salts may be used alone or in combination of 2 or more.

The reducing agents include, for example, hydrazine, metal hydrides and alkali formates and preferred are metal hydrides, and especially preferred are sodium borohydride and calcium hydride.

As the inert solvents, mention may be made of, for example, hydrocarbons such as benzene, toluene, xylene, biphenyl, terphenyl, naphthalene and anthracene and ethers such as diphenyl ether, p-diphenoxybenzene and polyethylene glycol. Of these solvents, preferred are high-boiling inert organic solvents.

In the process of this invention, the reaction of the first stage can be performed by blending the dihalogeno aromatic compound (component [A]), the alkali metal sulfide (component [B]), the lithium compound (component [C]) and the polar solvent (component [D]) or blending said components [A], [B], [C] and [D] and further one or two or more components selected from the branching agent or molecular weight adjusting agent such as active hydrogen-containing halogeno aromatic compounds, polyhalogeno aromatic compounds, polyhalogeno nitro compounds and cyanuric chloride, the liquid property adjusting agent, the polymerization additive, the reducing agent and the inert solvent. One of important points in the process of this invention is to carry out the reaction of the first stage in the presence of substantially no water.

When said components [A], [B], [C] and [D] are substantially anhydrides or contain no water, sequence of blending of these components for the reaction of the first stage is not critical. On the other hand, when at least one of these components contains water, a dehydration operation is carried out before reaction to make the reaction system substantially anhydrous by adjusting the sequence of blending of the components and the method of dehydration operation.

The reaction of the first stage begins substantially between component [A] and [B]. Therefore, if at least one of the components is in a hydrous state or is a hydrate, it is desired that before blending component [A] with component [C] or blending component [B] with component [A], the component containing water or a blend containing water is subjected to a dehydration operation to produce a substantially anhydrous state.

Specifically, when the reaction of the first stage is carried out by contacting components [A], [B], [C] and [D] with each other and when at least one of components [B], [C], and [D] is in a hydrous state or hydrated state (for example, when a salt hydrate such as sodium sulfide nonahydrate is used as component [B], components [B], [C] and [D] are blended to prepare a mixed solution for prepration of the reaction system and this mixed solution is subjected to, for example, a dehydration operation such as azeotropic distillation to prepare a mixed solution for the reaction system of a substantially anhydrous state. This mixed solution is blended with component [A] of a substantially anhydrous state to form a reaction system.

Furthermore, when the above mentioned other components are used in addition to the components [A], [B], [C] and [D] and, for example, at least one of components [B], [C], and [D] is in a hydrous state or hydrated state, the other components are blended with components [B], [C] and [D] to prepare a mixed solution for the reaction system, water is removed from this mixed solution by a dehydration operation such as azeotropic distillation to obtain a mixed solution of a substantially anhydrous state and this mixed solution is blended with component [A] of a substantially anhydrous state simultaneously or stepwise to form a reaction system.

When each of said components used for forming a reaction system is in a substantially anhydrous state, the above exemplified sequence and method of blending can be employed without carrying out the dehydration operation.

In any event, if the reaction in the first stage is carried out in the presence of substantially no water, sequence and method of blending of the components have no special limitation.

The "in the presence of substantially no water" used herein cannot be evenly defined because the scope of definition thereof varies depending on other various conditions such as kind and blending ratio of the components used and reaction conditions, but means that the amount of water contained in the reaction system is normally 0.1 mol or less, preferably 0.05 mol or less per 1 mol of said component [B] used.

When the amount of water is more than 0.1 mol per 1 mol of component [B], sometimes the reaction vessel is corroded or the resulting polyarylene sulfide is colored, purity thereof decreases or polymers of high molecular weight cannot be obtained.

Blending ratio of the components in the reaction of the first stage is desirably as follows.

That is, molar ratio of component [A]/component [B] is 0.75-2.0, preferably 0.90-1.2. This range is normally employed since the reaction of the dihalogeno aromatic compound [A] and the alkali metal sulfide [B] is an equimolar reaction.

Molar ratio of component [C]/component [B] is normally 0.001-2.0, preferably 0.01-1.5. If this molar ratio is less than 0.001, sometimes the molecular weight of the resulting polyarylene sulfide is low or the content of salts remaining in the polymer such as sodium chloride, namely, impurity salts, cannot be sufficiently reduced. If more than 2.0, salt used as catalyst remains in the resulting polymer at high concentration.

When lithium sulfide is used as component [B], this lithium sulfide can be considered to be both component [C] and component [B].

Molar ratio of component [D]/component [B] is 1-15, preferably 2-10. When this molar ratio is less than 1, sometimes the reaction becomes nonuniform and when more than 15, sometimes productivity lowers.

The reaction in the first stage is carried out at a temperature of normally 200-270° C., preferably 210-265° C. If the reaction temperature is lower than 200° C., the reaction rate is not sufficeint and if higher than 270° C., sometimes polyarylene sulfide of high molecular weight cannot be obtained. Reaction time is set so that the concentration of remaining component [B] is 5.5 g/l or less, preferably 2.7 g/l or less in terms of sulfur for polar solvent [D]. Therefore, this reaction time varies depending on kind and amount of the components used and conditions such as reaction temperature and cannot be evenly specified, but usually is 0.2-2 hours.

According to this invention, after the reaction of the first stage, water is added to the reaction system, followed by carrying out the reaction (polycondensation reaction) of the second stage.

Amount of the water to be added is usually 0.1-10 mols, preferably 0.5-2.5 mols per 1 mol of the alkali metal sulfide [B]. When the amount of water is less than 0.1 mol per 1 mol of alkali metal sulfide [B], sometimes polyarylene sulfide of high molecular weight cannot be obtained and when more than 10 mols, there may occur problems such as corrosion of the reaction vessel.

Reaction temperature in the second stage reaction is usually 220-280° C., preferably 240-270° C. When the temperature is lower than 220° C., the reaction rate of the polycondensation reaction is not sufficient and sometimes polyarylene sulfide of high molecular weight cannot be obtained. When the temperature is higher than 280° C., side reactions may take place or productivity of polyarylene sulfide of high molecular weight may be decreased. Reaction time for this reaction is usually less than 20 hours, preferably 0.1-8 hours.

Reaction pressure for the reactions of the first and second stages has no special limitation, but is usually from the spontaneous pressure of the reaction system such as solvent to about 10 kg/ (absolute). These reactions may be effected in an inert gas atmosphere such as nitrogen or carbon dioxide.

The reaction of the second stage can be effected by adding the necessary above-mentioned components to the reaction system. Sequence and method of blending these components have no special limitation. Usually, after addition of water, the necessary components are added to the reaction system and thereafter, the second reaction is carried out.

Addition amounts of the components added for the second stage reaction can be such that the sum of the amount of the components added for the first stage reaction and the amount of the component to be freshly added for the second stage reaction is within the respective range of the respective component mentioned above.

If the components added for the second stage reaction contain water, it is desired that sum of amounts of water contained in the respective components and the amount of the water added before the second stage reaction is within the range of water content as mentioned above.

After completion of the second stage reaction, polyarylene sulfide can be obtained by direct separation from the reaction mixture by standard methods such as filtration and centrifugal separation or by separation from the reaction mixture to which water and/or diluted acid has been added.

Subsequent to the filtration, the polymer is washed with water to remove any inorganic components such as alkali metal sulfide which may usually adhere to the polymer. In addition to or after this washing step, the polymer may be subjected to washing or extraction with another washing solution such as methanol. It is also possible to recover the polymer by distilling off the solvent from the reaction vessel and then washing the product as mentioned above.

In this way, polyarylene sulfides such as white polyphenylene sulfide of high purity and high molecular weight can be easily and stably obtained.

If necessary, the thus recovered polyarylene sulfide is further subjected to various desalting treatments to reduce the concentration of salts such as sodium chloride in the polymer and can be suitably utilized in the electrical and electronic fields.

When the thus obtained polyarylene sulfide such as polyphenylene sulfide is molded into various articles, this may be mixed with other polymers, pigments, fillers such as graphite, metallic powder, glass powder, quartz powder, glass fiber and carbon fiber or additives normally used for polyarylene sulfide such as stabilizers and releasing agents.

The polyarylene sulfides such as polyphenylene sulfide obtained by the process of this invention are white in color, high in purity, small in melt flow and high in molecular weight and besides are low in salt content such as sodium chloride and thus can be produced as resins of high moisture resistance and electrical insulation.

Therefore, they can be used as matrix resins for various molded articles and composite materials. Further, they can be made into various molded articles, films, fibers and the like. They are excellent engineering plastics which can be suitably used not only as mechanical parts, but also as electrical parts and electronic parts.

Therefore, according to this invention, polyarylene sulfides such as polyphenylene sulfide which are white, high in purity, low in melt flow and high in molecular weight can be easily and stably produced in high yields without causing corrosion of apparatus such as reaction vessel and besides without causing gelation of the resulting polymers. If necessary, the branching degree and molecular weight of the polyarylene sulfides can be controlled in a wide range.

That is, the process of this invention can exhibit markedly superior effects to the conventional processes in production and working of the polymers and quality thereof.

EXAMPLE 1

81.5 g (0.55 mol) of p-dichlorobenzene and 25.0 g (0.54 mol) of anhydrous lithium sulfide were charged in a 2 liter autoclave (made of SUS 316L), followed by adding thereto 306 ml (0.23 mol) of N-methyl-2-pyrrolidone (NMP), flowing nitrogen therethrough at room temperature for 10 minutes and then heating to 120° C. with stirring. The autoclave was sealed and kept at 230° C. for 1.5 hour to carry out the first stage reaction. Content of lithium sulfide in the reaction system was 2.1 g/1-NMP in terms of sulfur measured by ion chromatography. Then, 9.7 g (0.54 mol) of distilled water was added to the reaction system and thereafter, temperature was gradually elevated to 265° C. and polymerization reaction (the second stage reaction) was effected over a period of 2 hours. After completion of the reaction, the reaction mixture was cooled to 175° C. with stirring and then allowed to stand until temperature reached room temperature. The reaction mixture was poured into 1 liter of water and subjected to filtration, washing with water and washing with methanol. The resulting white polyphenylene sulfide had a melt flow (measuring conditions; 300° C., load: 50 kg/cm$^2$ and length of nozzle: 10 mm) of $4.2 \times 10^{-2}$ ml/sec and a melting point of 290° C. measured by DSC and yield was 98% by weight.

EXAMPLE 2

In a 2 liter autoclave were charged 130.4 g (0.54 mol) of sodium sulfide nonahydrate, 23.0 g (0.54 mol) of lithium chloride and 370 ml of N-methyl-2-pyrrolidone and 288 ml of distillate was removed by azeotropic distillation. Then, thereto were added 81.5 g (0.56 mol) of p-dichlorobenzene and 110 ml of N-methyl-2-pyrrolidone and the first stage reaction was effected at 255° C. for 1 hour under nitrogen. Amount of sodium sulfide in the reaction system was 1.8 g/1-NMP in terms of sulfur measured by ion chromatography.

After 9.7 g (0.4 mol) of distilled water was added to the reaction system, the system was heated to 260° C. and polymerization reaction (the second stage reaction) was effected over a period of 2 hours. After completion of the reaction, the reaction mixture was subjected to cooling, filtration, washing with water and washing with methanol. The resulting white polyphenylene sulfide had a melt flow of $2.8 \times 10^{-2}$ ml/sec and a melting point of 290° C. Yield was 94% by weight.

COMPARATIVE EXAMPLE 1

Reaction 1 was repeated except that 9.7 g (0.54 mol) of distilled water was added before the first stage reaction and distilled water was not added at the second stage reaction. Concentration of remaining lithium sulfide before addition of distilled water was 57.6 g/1-NMP. The resulting polyphenylene sulfide had a melt flow of $13.8 \times 10^{-2}$ ml/sec and a melting point of 288° C. Yield was 90% by weight. Inner wall of the autoclave rusted in black.

COMPARATIVE EXAMPLE 2

Example 1 was repeated except that distilled water was not added. The resulting light yellow polyphenylene sulfide had a melt flow of $5.8 \times 10^{-2}$ ml/sec and a melting point of 289° C. Yield was 93% by weight.

COMPARATIVE EXAMPLE 3

Example 2 was repeated except that 9.7 g (0.54) mol) of distilled water was added before the first stage reaction and it was not added at the second stage reaction. Concentration of remaining sodium sulfide before addition of the distilled water was 56.9 g/1-NMP. The resulting light yellow polyphenylene sulfide had a melt flow of $10.2 \times 10^{-2}$ ml/sec and a melting point of 293° C. Yield was 90% by weight.

COMPARATIVE EXAMPLE 4

Example 2 was repeated except that distilled water was not added. The resulting light yellow polyphenylene sulfide had a melt flow of $3.4 \times 10^{-2}$ ml/sec and a melting point of 292° C. Yield was 94% by weight.

What is claimed is:

1. A process for producing a polyarylene sulfide which comprises as a first stage, reacting (A) a dihalogeno aromatic compound with (B) an alkali metal sulfide in (D) a polar solvent in the presence of (C) a lithium compound and in the presence of substantially no water at 200–270° C. until the concentration of alkali metal sulfide is 5.5 g/1-polar solvent or less in terms of sulfur; then adding water in an amount of 0.1–10 mols per 1 mol of said alkali metal sulfide; and, thereafter, as a second stage, carrying out the reaction at 200–280° C.; wherein, at the beginning of the first stage reaction, the molar ratio of (A)/(B) is 0.75–2.0, the molar ratio of (C)/(B) is 0.001–2.0 and the molar ratio of (D)/(B) is 1–15.

2. A process according to claim 1 wherein the dihalogeno aromatic compound is p-dichlorobenzene.

3. A process according to claim 1 wherein the alkali metal sulfide is at least one compound selected from the group consisting of sodium sulfide and lithium sulfide.

4. A process according to claim 1 wherein the lithium compound is at least one compound selected from the group consisting of lithium chloride and lithium sulfide.

5. A process according to claim 1 wherein the polar solvent is N-methylpyrrolidone.

* * * * *